US012769453B2

(12) United States Patent
Boenapalli et al.

(10) Patent No.: US 12,769,453 B2
(45) Date of Patent: Oct. 20, 2026

(54) SYSTEMS AND METHODS FOR IMPROVING ENDURANCE OF UNIVERSAL FLASH STORAGE (UFS) DEVICES

(71) Applicant: Qualcomm Incorporated, San Diego, CA (US)

(72) Inventors: Madhu Yashwanth Boenapalli, Hyderabad (IN); Sai Praneeth Sreeram, Anantapur (IN); Santhosh Reddy Akavaram, Hyderabad (IN); Chintalapati Bharath Sai Varma, Hyderabad (IN); Surendra Paravada, Hyderabad (IN); Radhakrishna Mugada, Hyderabad (IN); Sang Tran, Encinitas, CA (US)

(73) Assignee: Qualcomm Incorporated, San Diego, CA (US)

( * ) Notice: Subject to any disclaimer, the term of this patent is extended or adjusted under 35 U.S.C. 154(b) by 9 days.

(21) Appl. No.: 18/984,198

(22) Filed: Dec. 17, 2024

(65) Prior Publication Data

US 2026/0169634 A1 Jun. 18, 2026

(51) Int. Cl.
*G06F 3/06* (2006.01)
*G06F 12/02* (2006.01)

(52) U.S. Cl.
CPC .......... *G06F 3/0616* (2013.01); *G06F 3/0604* (2013.01); *G06F 3/0647* (2013.01); *G06F 3/0679* (2013.01); *G06F 12/0246* (2013.01)

(58) Field of Classification Search
None
See application file for complete search history.

(56) References Cited

U.S. PATENT DOCUMENTS

2021/0034513 A1* 2/2021 Kim .................... G06F 12/1491
2021/0365202 A1* 11/2021 Shin ...................... G06F 3/0679
2024/0078020 A1* 3/2024 Basu ..................... G06F 3/0619

* cited by examiner

*Primary Examiner* — Kaushikkumar M Patel
(74) *Attorney, Agent, or Firm* — SMITH TEMPEL BLAHA LLC

(57) ABSTRACT

Systems and methods are provided for enhancing the endurance of a Universal Flash Storage (UFS) device by providing a UFS pinned region relocation mechanism that relocates the UFS pinned region of the write booster buffer to a portion of the write booster buffer that was previously part of a non-pinned region of the write booster buffer based on an indication of the health of the UFS pinned region. The UFS pinned region of the write booster buffer may be relocated to a portion of the previously non-pinned region of the write booster buffer that is determined to have the lowest endurance of all portions of the previously non-pinned region.

20 Claims, 6 Drawing Sheets

301

| ATTRIBUTES | | | | | | |
|---|---|---|---|---|---|---|
| IDN | Name | Access Property | Size | Type[1] # Ind.[2] # Sel.[3] | MDV[4] | Description |
| 44 h | bPinnedWriteBoosterBufferRelocate | Read Only | 1 Byte | D | 0 | This attribute determines the % read operations targeted on Pinned region over a period of time<br>The % reported by this attribute indicates the health of the current Pinned Write Booster Buffer region formedby taking the feedback from the bWriteBoosterBufferLifeTimeEst of the Current Pinned Write Booster Buffer Region.<br>Value expressed in unit of 10% granularity<br>00h : 0%<br>01h ~ 09h : 10% to 90% of Pinned region's P/E cycles utilized.<br>0Ah : 100% of Pinned region's P/E cycles consumed. |

FIG. 3

SYSTEMS AND METHODS FOR IMPROVING ENDURANCE OF UNIVERSAL FLASH STORAGE (UFS) DEVICES

DESCRIPTION OF THE RELATED ART

A computing device may include multiple processor-based subsystems. Such a computing device may be, for example, a portable computing device ("PCD"), such as a laptop or palmtop computer, a cellular telephone or smartphone, a portable digital assistant, a portable game console, etc. Still other types of PCDs may be included in automotive and Internet-of-Things ("IoT") applications. A computing device may also be a stationary computer, such as a personal computer (PC) or various types of desktop computers or workstation computers.

Such processor-based subsystems may be included within the same integrated circuit chip or in different chips. A "system-on-a-chip", or "SoC", is an example of one such chip that integrates numerous subsystems to provide system-level functionality. For example, an SoC may include one or more types of processors, such as central processing units ("CPU"), graphics processing units ("GPU"), digital signal processors ("DSP"), and neural processing units ("NPU"). An SoC may include other subsystems, such as a transceiver or "modem" subsystem that provides wireless connectivity, a memory subsystem, etc.

Computing devices also include various types of memory devices that are used by the processing units for storing data and computer instructions, including Universal Flash Storage (UFS) devices. UFS devices often include NOR or NAND flash memory devices. Two types of NAND flash memory devices that are commonly found in computing devices today include single-level-cell (SLC) NAND flash memory devices and triple-level-cell (TLC) NAND flash memory devices. SLC NAND flash memory devices store a single bit of information per cell, either a 0 or 1. As a result, the data can be written to and retrieved from SLC NAND flash memory at very high speed. TLC NAND flash memory stores 3 bits per cell. Adding more bits per cell reduces cost and increases capacity, but negatively impacts performance and endurance. Many consumer products use TLC NAND flash memory because it is less expensive than SLC NAND flash memory.

SLC NAND flash memory has better performance and higher endurance than TLC NAND flash memory, having a life expectancy of 100,000 program/erase (P/E) cycles compared to 3,000 P/E cycles for TLC NAND flash memory. However, because SLC NAND flash memory is more expensive than TLC NAND memory, it is not commonly used in consumer products. It is typically used for servers and for other industrial applications that require high speed and endurance.

Write performance of TLC NAND flash memory devices is much lower than write performance of SLC NAND flash memory devices due to the greater number of bits per cell. To overcome this lower write performance of TLC NAND flash memory, it is known for a main memory portion of the UFS device to comprise TLC NAND flash memory and for a smaller write booster buffer of the UFS device to comprise SLC NAND flash memory. Using SLC NAND flash memory as the write booster buffer enables a write request to be processed with lower latency, leading to an overall improvement in the write performance of the UFS device. Data written to the write booster buffer is typically flushed into the TLC NAND flash memory portion by an explicit command of the host processor of the computing device or implicitly while the computing device is in a hibernate (HIBERN8) state.

A specific, fixed region of the write booster buffer known as the UFS pinned region is used to store frequently accessed data such as, for example, operating system (OS) files, boot files, frequently used apps and UFS meta data. Using the UFS pinned region to store frequently accessed data allows the UFS device controller to avoid unnecessary data movement during frequent access that can increase the write amplification factor (WAF) of the UFS device. The WAF is a measurement of how much the actual amount of data that is written to memory differs from the logical amount of data that was intended to be written due to data being moved around in memory. Another benefit of using the UFS pinned region to store frequently accessed data is that it provides higher speed access to the data and performance predictability.

However, reading data repeatedly from the same physical block of flash memory cells over a period of time can lead to a shift in the threshold (TH) voltage levels of other flash memory cells that are in the same physical block as those that are repeatedly read. These shifts in the TH voltage levels accumulate over multiple read cycles at different temperatures.

Over time, the TH voltage level of a cell in an "unprogrammed" state (i.e., the cell stores a logic 1) increases and accumulates enough that it eventually shifts the cell to the "programmed" state (i.e., it stores a logic 0). This is known as read disturbance phenomenon and can result in a read disturbance error if the shifts exceed a certain limit. The read disturbance phenomenon detrimentally impacts flash memory endurance because it alters the logical state of the cells.

Repeatedly reading data from the UFS pinned region of the write booster buffer can lead to the occurrence of the read disturbance phenomenon, which can detrimentally impact UFS device endurance. A need exists for a way to enhance UFS device endurance by preventing or at least reducing the occurrence of the read disturbance phenomenon.

SUMMARY OF THE DISCLOSURE

Systems, methods, and other examples are disclosed for enhancing UFS device endurance.

A method for enhancing an endurance of a Universal Flash Storage (UFS) device may include determining a lifetime estimate value of a pinned region of a write booster. The method may further include determining whether the lifetime estimate value exceeds a preselected lifetime estimate threshold (TH) value. In response to a determination that the lifetime estimate value exceeds the preselected lifetime estimate TH value, then the method may include relocating the pinned region to a portion of a non-pinned region of the write booster.

A system for enhancing an endurance of a Universal Flash Storage (UFS) device may include a write booster buffer comprising a pinned region and a non-pinned region. The system may also include first logic configured to determine a lifetime estimate value of the pinned region and second logic configured to determine whether the lifetime estimate value exceeds a preselected lifetime estimate threshold (TH) value. The system may also include third logic configured to relocate the pinned region to a portion of the non-pinned region in response to a determination that the lifetime estimate value exceeds the preselected lifetime estimate TH value.

A computer program product may include a non-transitory computer usable medium having a computer readable program code embodied therein. The computer readable program code may be adapted to execute a method for enhancing endurance of a Universal Flash Storage (UFS) device. The method of the computer program product may include determining a lifetime estimate value of a pinned region of a write booster and determining whether the lifetime estimate value exceeds a preselected lifetime estimate threshold (TH) value. And in response to a determination that the lifetime estimate value exceeds the preselected lifetime estimate TH value, the method of the computer program product may include relocating the pinned region to a portion of a non-pinned region of the write booster.

These and other features and advantages will become apparent from the following description, drawings and claims.

BRIEF DESCRIPTION OF THE DRAWINGS

In the Figures, like reference numerals refer to like parts throughout the various views unless otherwise indicated.

FIG. 3 shows the data structure of an attribute in accordance with an exemplary embodiment of the present disclosure that the UFS device controller shown in FIG. 1 uses to determine when a lifetime estimate of the UFS pinned region exceeds a preselected threshold (TH) value.

DETAILED DESCRIPTION

Figure 1:
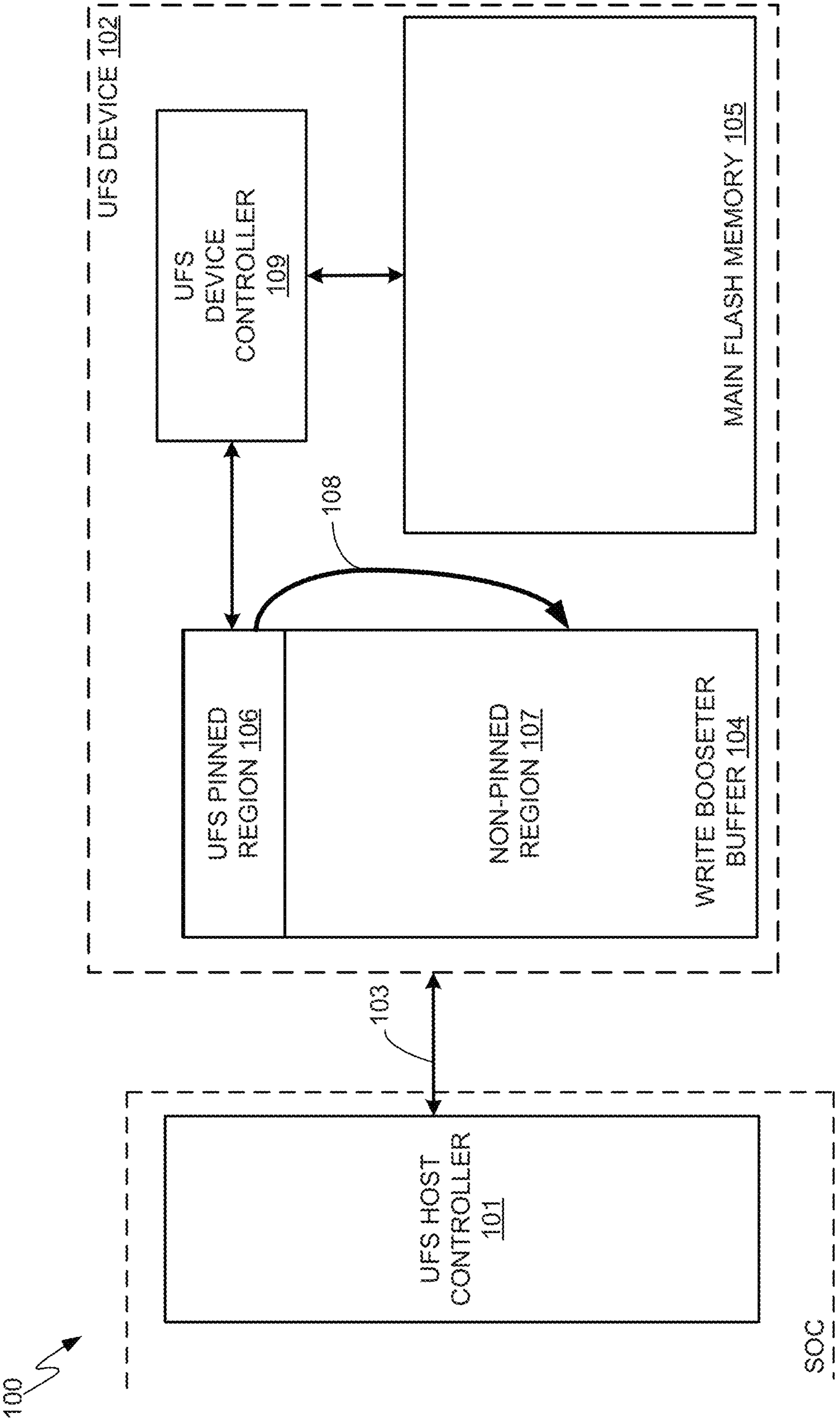
FIG. 1 illustrates a block diagram of a UFS system in accordance with a representative embodiment of the present disclosure comprising a UFS host controller and a UFS device that is in communication with the UFS host controller via a host controller-to-UFS device link.

As indicated above, repeatedly reading data from the UFS pinned region of the write booster buffer can lead to the occurrence of the read disturbance phenomenon, which can detrimentally impact UFS device endurance. The present disclosure provides systems and methods for improving UFS device endurance by providing a UFS pinned region relocation mechanism that relocates the UFS pinned region of the write booster buffer to a portion of the write booster buffer that was previously part of a non-pinned region of the write booster buffer based on an indication of the health of the UFS pinned region. Preferably, the UFS pinned region of the write booster buffer is relocated to a portion of the previously non-pinned region of the write booster buffer that is determined to have the lowest endurance of all portions of the previously non-pinned region.

In the following detailed description, for purposes of explanation and not limitation, exemplary, or representative, embodiments disclosing specific details are set forth in order to provide a thorough understanding of an embodiment according to the present teachings. The word "exemplary" is used herein to mean "serving as an example, instance, or illustration." The words "illustrative" or "representative" may be used herein synonymously with "exemplary." Any aspect described herein as "exemplary" is not necessarily to be construed as preferred or advantageous over other aspects. However, it will be apparent to one having ordinary skill in the art and having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements'relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory device", as that term is used herein, is intended to denote a non-transitory computer-readable storage medium that is capable of storing computer instructions, or computer code, for execution by one or more processors. References herein to a "memory device" should be interpreted as including one or more memory devices.

A "processor", as that term is used herein, encompasses an electronic component that carries out tasks in hardware, software, and/or firmware. For example, a processor can be an electronic component that is programmed to execute a computer program or executable computer instructions. A processor can also be an electronic component comprising one or more state machines. A processor may be a multi-core processor comprising multiple processing cores, each of which may comprise multiple processing stages of a processing pipeline. A processor may also refer to a collection of processors within a single system or distributed amongst multiple systems. A "controller", as that term is used herein, can mean, for example, a processor, such as a multi-core microprocessor, or a microcontroller.

A computing device may include multiple subsystems, cores or other components. Such a computing device may be, for example, a PCD, such as a laptop or palmtop computer, a cellular telephone or smartphone, a portable digital assistant, a portable game console, an automotive safety system, etc., or a non-portable computing device (NPCD) such as, for example, a PC, a desktop or a workstation computer.

FIG. 1 illustrates a block diagram of a UFS system 100 in accordance with a representative embodiment comprising a UFS host controller 101 and a UFS device 102 that is in communication with the UFS host controller 101 via a host controller-to-UFS device link 103. The UFS device 102 comprises a UFS device controller 109, a write booster buffer 104 and main flash memory 105. As indicated above, the write booster buffer 104 typically comprises SLC NAND flash memory cells and the main flash memory 105 typically comprises TLC NAND flash memory cells, although it should be noted that the inventive principles and concepts are not limited to the write booster buffer 104 and the main flash memory 105 comprising any particular types of flash memory cells.

As indicated above, the write booster buffer 104 is typically configured to have a UFS pinned region, which is represented in FIG. 1 by block 106, and a non-pinned region 107, which generally comprises the flash memory cells of the write booster buffer 104 that are outside of the UFS pinned region 106. Repeatedly reading data from the UFS pinned region of the write booster buffer can lead to the occurrence of the read disturbance phenomenon, which can detrimentally impact UFS device endurance.

The JEDEC UFS 4.0 standard provides a write booster buffer partial flush mechanism that, when enabled, causes the UFS device controller 109 to flush (i.e., write) all of the data stored in the non-pinned region 107 of the write booster buffer 104 to the main flash memory 105 without flushing the data that is stored in the UFS pinned region 106 to the main flash memory 105. Data stored in the non-pinned region 107 is also flushed to the main flash memory 105 at other times, such as when the command queue of the UFS host controller 101 is empty. The non-pinned region 107 is also written more often than the UFS pinned region 106. The more frequent writing and flushing of the non-pinned region 107 means that the flash memory cells of the non-pinned region 107 are subjected to more program/erase (P/E) cycles than the UFS pinned region 106, which lowers the endurance of the non-pinned region 107 relative to the endurance of the UFS pinned region 106.

In accordance with embodiments of the present disclosure, a pinned region relocation mechanism is provided that relocates the UFS pinned region 106 to a portion of the write booster buffer 104 that was previously part of the non-pinned region 107 when the endurance of the pinned region 106 drops below a preselected threshold (TH) value. This feature safeguards the write booster buffer 104 from read disturbance errors. In accordance with a preferred embodiment, the UFS pinned region 106 is relocated to a portion of the previously non-pinned region determined to have the lowest endurance of all of the portions of the write booster buffer that were previously part of the non-pinned region 107. This latter feature helps to normalize the endurance of the flash memory cells that are part of the non-pinned region 107.

Figure 2:
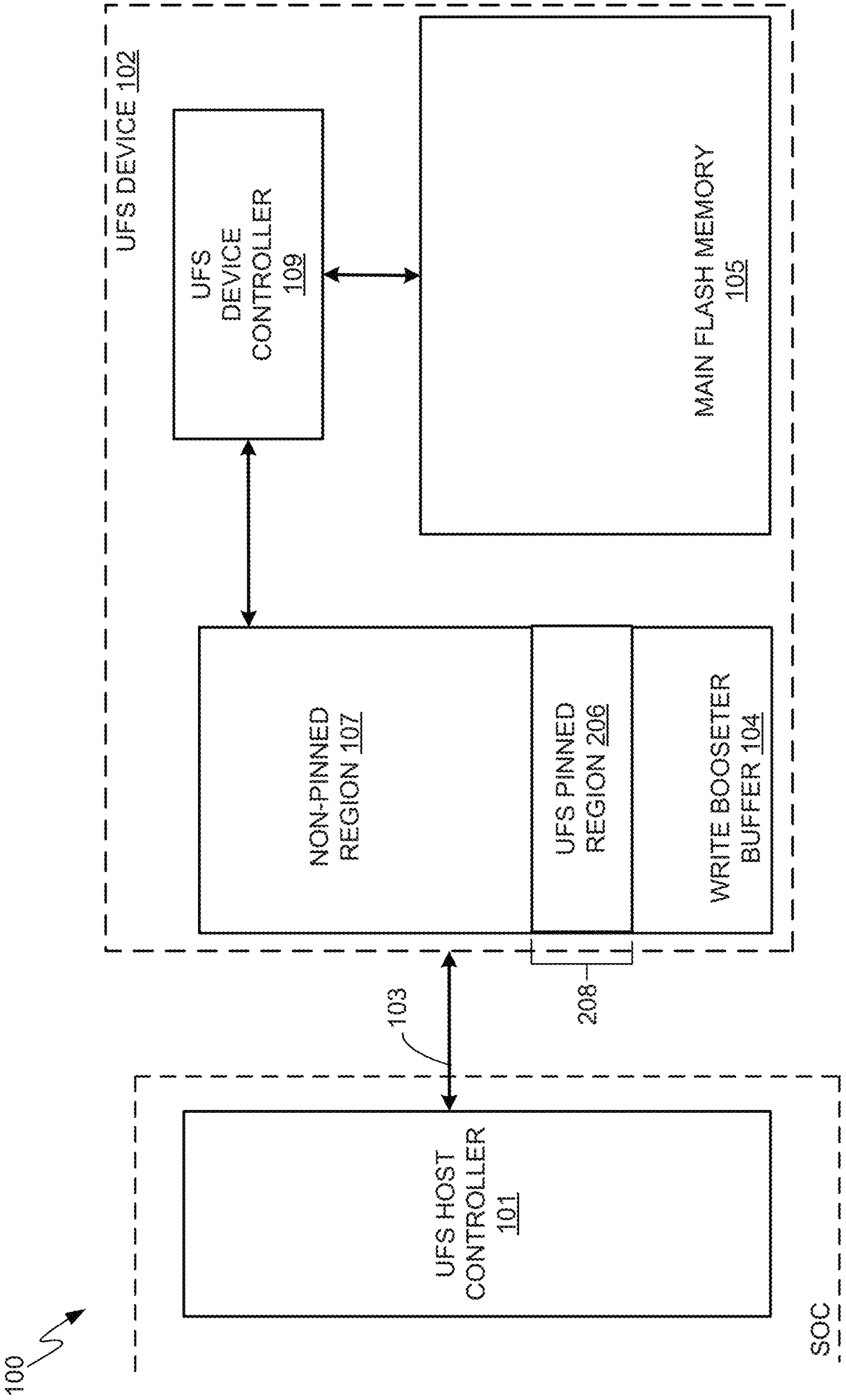
FIG. 2 illustrates a block diagram of the UFS system shown in FIG. 1 after the UFS pinned region of the write booster buffer shown in FIG. 1 has been relocated, or shuffled, to a portion of the non-pinned region of the write booster buffer in accordance with a representative embodiment.

FIG. 2 illustrates a block diagram of the UFS system 100 shown in FIG. 1 after the UFS pinned region 106 of FIG. 1 has been relocated, or shuffled, to a portion 208 of the non-pinned region 107 and now labeled as UFS pinned region 206 in FIG. 2 in accordance with a representative embodiment. Relocation of the UFS pinned region 106 of FIG. 1 is represented by arrow 108 in FIG. 1.

Preferably the UFS pinned region 106 of FIG. 1 is relocated, or shuffled, to portion 208 of FIG. 2 while the link 103 is hibernated. The new logical-to-physical (L2P) mapping of the new UFS pinned region 206 is saved by the UFS controller 103 and communicated to the host controller 101 via link 103, which also saves the new L2P mapping. Specifically, the new L2P mapping may be saved to memory 628 (see FIG. 6) and/or in the UFS device 102 (i.e. such as in cache in the UFS device 102 not shown).

The JEDEC 4.0 UFS standard currently provides a write booster buffer health attribute that is used to inform the UFS host controller 101 of the lifetime estimate of the write booster buffer. The attribute that is used for this purpose is called the bWriteBoosterBufferLifeTimeEst attribute.

The value of the bWriteBoosterBufferLifeTimeEst attribute is based on the number of program/erase ("P/E") cycles performed on the blocks of the write booster buffer 104. The endurance, also referred to herein as the lifetime, of each block of flash memory cells of the write booster buffer 104 is reduced as the number of P/E cycles performed on the block increases.

Thus, an increase in the bWriteBoosterBufferLifeTimeEst value, corresponds to a decrease in the remaining lifetime, i.e., in the endurance, of the respective block. Once the bWriteBoosterBufferLifeTimeEst value reaches or exceeds a TH value, the UFS device 102 informs the UFS host 101.

However, the current JEDEC 4.0 UFS standard does not call for determining separate bWriteBoosterBufferLifeTimeEst values for the UFS pinned region 106 and for the non-pinned region 107. Rather, the current standard calls for determining the bWriteBoosterBufferLifeTimeEst value for the write booster buffer 104 as a whole.

In accordance with representative embodiments of the present disclosure, the UFS device controller 109 uses the bWriteBoosterBufferLifeTimeEst attribute to determine separate lifetime estimates for the UFS pinned region 206 and for the non-pinned region 107 of FIG. 2. This generally is a block by block calculation, i.e., where the UFS device controller 109 determines for each block whether the number of P/E cycles performed on each block exceeds a TH value.

Since the UFS device controller 109 will have the L2P mapping available, it may determine which blocks of an address correspond to the write booster buffer 104 and which blocks among these correspond to the pinned region 106 and non-pinned region 107 of FIG. 1. In view of this, an average P/E of the blocks corresponding to pinned region 106 yields the estimate of P/E for the pinned region and this may be compared against the TH value. The same calculation may be made for the non-pinned region 107 in a similar manner.

When the lifetime estimate for the UFS pinned region 106 exceeds the preselected TH value (e.g., X percent), then a decision is made to shuffle the UFS pinned region 106 of FIG. 1 to the portion 208 in FIG. 2 to form UFS pinned region 206. If a decision is made to shuffle the UFS pinned region 106 of FIG. 1, then a decision is also made as to which portion of the non-pinned region 107 is to be allocated for use as the new UFS pinned region 206 of FIG. 2. The new UFS pinned region 206 of FIG. 2 may be a contiguous portion 208 of the write booster buffer 104. In other exemplary embodiments, the new UFS pinned region 206 of FIG. 2 may also be a non-contiguous portion of the write booster buffer 104.

In accordance with a representative embodiment, the UFS device controller 109 compares the bWriteBoosterBuffer- LifeTimeEst values of the different portions of the non-pinned region 107 in FIG. 1 to one another to which portion has the least lifetime remaining, or endurance, and allocates the portion with the least remaining lifetime to be used as the new UFS pinned region 206 in FIG. 2. The different portions of the non-pinned region 107 may comprise one block or, two or more groups of blocks.

When the UFS device controller 109 determines that the lifetime estimate for the UFS pinned region 106 exceeds the preselected TH value (e.g., X percent), it notifies the UFS host controller 101, preferably by using a PINNED_WRITEBOOSTER_HEALTH_THRESHOLD exception mechanism. It would be helpful for the UFS host controller 101 to be aware of the health condition of the UFS pinned region 106 at startup, and therefore this determination and notification preferably are usually made at runtime.

The determination as to which portion of the non-pinned region 107 of FIG. 1 is to be allocated for use as the new UFS pinned region 206 of FIG. 2 preferably is also made at runtime. Post notification of the UFS host controller 101, during hibernate mode, i.e., when the link 103 is hibernated, the UFS pinned region 106 is shuffled, i.e., relocated to the new location 206 in FIG. 2 and the UFS device controller 109 causes the new L2P address mapping to be sent to the UFS host controller 101.

According to another exemplary embodiment, a new attribute may be introduced: a bPinnedWriteBoosterBuffer-Shuffle attribute. This value may be introduced which helps in monitoring the health of the pinned region 106 of FIG. 1 by taking the feedback from the bWriteBoosterBufferLife-TimeEst of the current pinned region 106 based on the feedback of which region among the non-pinned region 107 has less endurance at that point of time.

Referring now to FIG. 3, this figure shows the data structure of an attribute 301 in accordance with an exemplary embodiment of the present disclosure that the UFS device controller 109 uses to determine when the lifetime estimate of the UFS pinned region 106 of FIG. 1 exceeds the preselected TH. In accordance with this exemplary embodiment, a bPinnedWriteBoosterBufferRelocate attribute 301 is used to report the lifetime estimate of the UFS pinned region 106 in 10% increments.

If the lifetime estimate determined by the UFS device controller 109 indicates that 0% of the P/E cycles of the UFS pinned region 106 of FIG. 1 have been consumed, the bit value of this attribute is set to 00 h. If the lifetime estimate determined by the UFS device controller 109 indicates that 10% to 90% of the P/E cycles of the UFS pinned region 106 of FIG. 1 have been consumed, the bit value of this attribute is set to 01 h to 09 h, respectively. If the lifetime estimate determined by the UFS device controller 109 indicates that 100% of the P/E cycles of the UFS pinned region 106 have been consumed, the bit value of this attribute is set to 0 Ah.

The bit value of this attribute 301 can be stored in a register of the UFS device controller 109 or in some other memory of the UFS device 102 and updated periodically when the UFS device controller 109 performs the aforementioned bWriteBoosterBufferLifeTimeEst attribute to determine lifetime estimates for the UFS pinned region 106. The UFS device controller 109 can be configured to periodically (e.g., at run time) perform the bWriteBoosterBufferLife-TimeEst attribute to determine lifetime estimate for the UFS pinned region 106 and/or it can be commanded by the UFS host controller 101 to perform the attribute to determine lifetime estimate for the UFS pinned region 106. Likewise, the UFS device controller 109 can be configured to periodically perform the bWriteBoosterBufferLifeTimeEst attribute to determine lifetime estimate for the non-pinned region 107 and/or it can be commanded by the UFS host controller 101 to perform the attribute to determine lifetime estimate for the non-pinned region 107.

The lifetime estimate TH value that is used to determine whether the UFS pinned region 106 of FIG. 1 is to be shuffled can be set as low or as high as desired and will typically be preselected by the original equipment manufacturer (OEM). For example, the lifetime estimate TH value can be set just below 80% such that if the lifetime estimate determined by the UFS device controller 109 indicates that 80% of the P/E cycles of the UFS pinned region 106 have been consumed, the relocation mechanism is triggered and the UFS pinned region 106 of FIG. 1 is relocated to portion 208 of FIG. 2 to form UFS pinned region 206 of FIG. 2.

In other words, a bit value of 08 h for the attribute 301 would cause the PINNED_WRITEBOOSTER_HEALTH_THRESHOLD exception mechanism to be triggered in the UFS device controller 109, which would cause it to notify the UFS host controller 101 that the UFS pinned region 106 of FIG. 1 needs to be shuffled, preferably the next time that the link 103 is placed in hibernate mode. After the shuffle, the UFS device controller 109 will inform the UFS host controller 101 of the new L2P address mapping for the new UFS pinned region 206 of FIG. 2.

As another example, the lifetime estimate TH value can be set just below 100% such that if the lifetime estimate determined by the UFS device controller 109 indicates that 100% of the P/E cycles of the UFS pinned region 106 have been consumed, the relocation mechanism is triggered and the UFS pinned region is relocated. In other words, a bit value of 0 Ah for the attribute 301 would cause the PINNED_WRITEBOOSTER_HEALTH_THRESHOLD exception mechanism to be triggered in the UFS device controller 109, which would cause it to notify the UFS host controller 101 that the UFS pinned region 106 of FIG. 1 needs to be shuffled the next time the link 103 is hibernated.

The UFS device controller 109 would then inform the UFS host controller 101 of the new L2P address mapping for the new UFS pinned region 206 of FIG. 2. After the shuffle, the UFS device controller 109 will inform the UFS host controller 101 of the new L2P address mapping for the new UFS pinned region 206 of FIG. 2.

Figure 4:
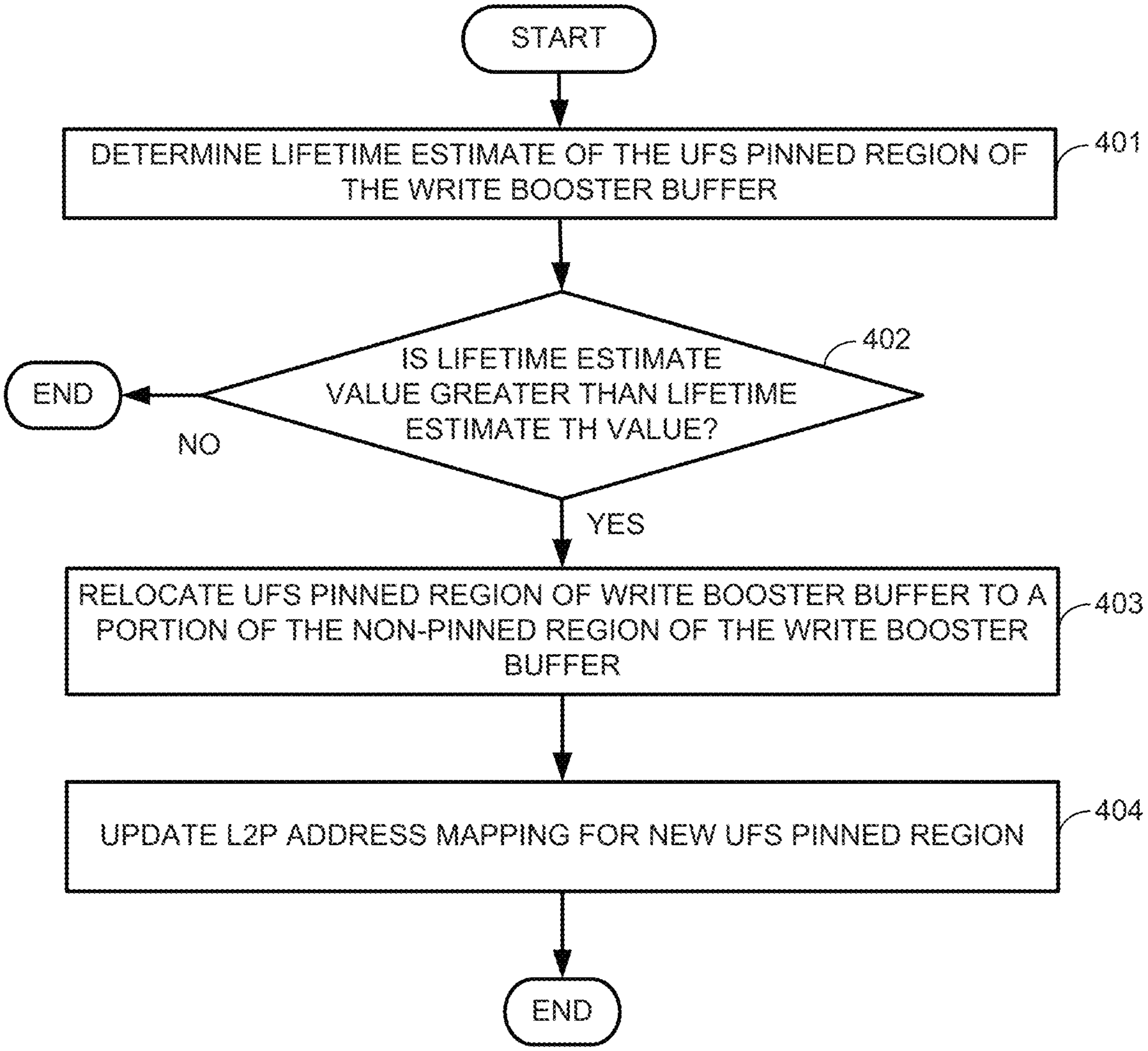
FIG. 4 is a flow diagram of the UFS pinned region shuffle process of the present disclosure in accordance with a representative embodiment.

FIG. 4 is a flow diagram of the UFS pinned region shuffle process of the present disclosure in accordance with a representative embodiment. Block 401 of the flow diagram represents the step of determining the lifetime estimate for the UFS pinned region. As indicated above, this step preferably involves the UFS device controller 109 using the bWriteBoosterBufferLifeTimeEst attribute to determine the lifetime, or endurance, estimate of the UFS pinned region 106 of FIG. 1. This step can be performed at run time, for example.

Block 402 represents the step of the UFS device controller 109 comparing the lifetime estimate obtained at step 401 with the lifetime estimate TH value to determine whether the lifetime estimate exceeds the TH value, as described above with reference to FIG. 3. It should be noted that in alternative embodiments, the lifetime estimate determined at block 401 is forwarded to the UFS host controller 101, which then performs the step represented by block 402.

If the lifetime estimate TH value does not exceed the lifetime estimate TH value, then the process can end and can be invoked at a later time, e.g., at start up. If the lifetime estimate TH value exceeds the lifetime estimate TH value, then the process proceeds to block 403. Block 403 represents the process of the UFS device controller 409 relocating the UFS pinned region 106 of FIG. 1 to a portion 208 of the non-pinned region 107 of the write booster buffer 104 of FIG. 2.

The process then proceeds to block 404 at which the UFS device controller 109 updates the L2P address mapping for the new UFS pinned region 206 of FIG. 2. The new L2P address mapping is saved in the UFS device 102 and is sent to the UFS host controller 101. The process can then end.

An attribute similar to attribute 301 shown in FIG. 3 can be used to determine which portion of the non-pinned region 107 will be allocated for use as the new UFS pinned region 106. As indicated above, in accordance with a preferred embodiment the UFS device controller 109 relocates the UFS pinned region 106 of FIG. 1 to a portion 208 of the non-pinned region 107 that has the least lifetime remaining of all of the other portions of the non-pinned region 107.

Figure 5:
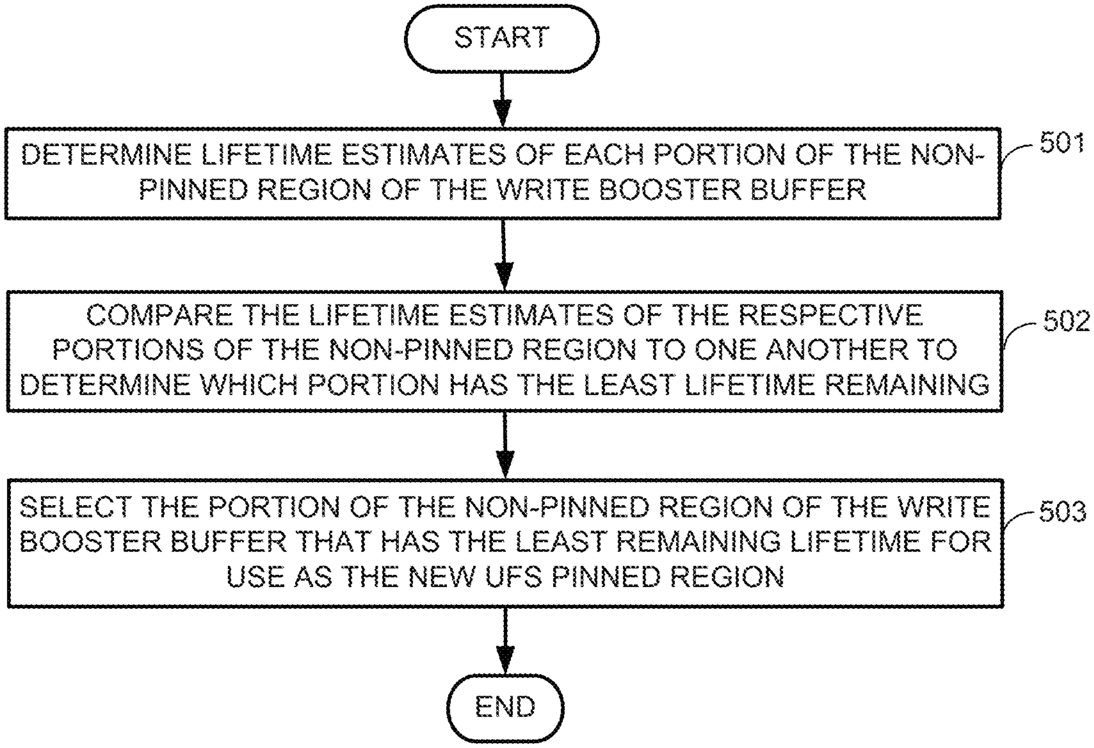
FIG. 5 is a flow diagram of the process of selecting a portion of the non-pinned region of the write booster buffer to be used for the new UFS pinned region in accordance with the preferred embodiment.

FIG. 5 is a flow diagram of the process of selecting a portion of the non-pinned region of the write booster buffer to be used for the new UFS pinned region in accordance with the preferred embodiment. Block 501 of the flow diagram represents the step of determining respective lifetime estimates for respective portions of the non-pinned region 107.

Portions of the non-pinned region 107 may comprise one or more blocks of flash cells. As noted above, the non-pinned region 107 of FIG. 1 is part of the write booster buffer 104. Typically, a smallest unit of memory cells may be referred to as a block in connection with a UFS device 102. Certain blocks of may be configured as the write booster blocks 104 which are further divided into the pinned regions 106 and the non-pinned regions 107.

Preferably the UFS device controller 109 uses the bWriteBoosterBufferLifeTimeEst attribute on all portions of the non-pinned region to determine a respective lifetime estimate for each respective portion of the non-pinned region 107.

The lifetime estimates of the respective portions are then compared to one another to determine which lifetime estimate is the least lifetime remaining, as indicated by block 502. The portion of the non-pinned region 107 of FIG. 1 that has the least amount of lifetime remaining is then selected to be used as the new UFS pinned region 206 of FIG. 2, as indicated by block 503.

As indicated above, selecting the portion of the non-pinned region 107 of FIG. 1 that has the least remaining lifetime for use as the new UFS pinned region 206 of FIG. 2 is preferable because doing so normalizes the endurance of the flash memory cells that are part of the non-pinned region 107.

It should be noted, however, that this is not necessary. Any portion of the non-pinned region 107 of FIG. 1 can be swapped with the UFS pinned region 106 in the step represented by block 404 in FIG. 4. For example, the portion of the non-pinned region 107 of FIG. 1 that has the median remaining lifetime can be selected for use as the new UFS pinned region 206 in FIG. 2.

The processes represented by the flow diagrams of FIGS. 4 and 5 can be merged. For example, the process represented by the flow diagram of FIG. 5 can be performed after the step represented by block 402 is answered in the affirmative and before the step represented by block 403 is performed.

Figure 6:
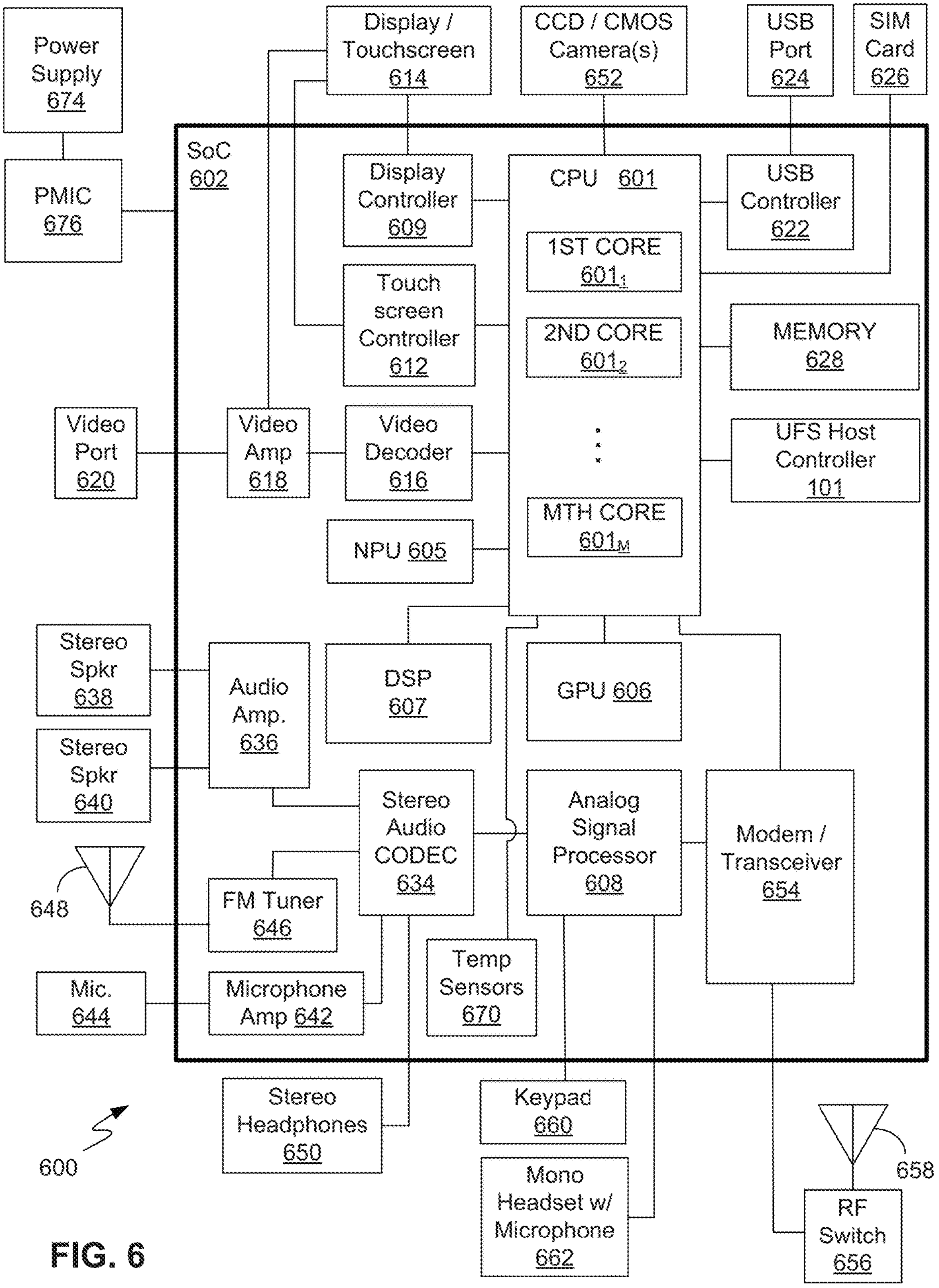
FIG. 6 illustrates an example of a portable computing device (PCD) in which exemplary embodiments of systems, methods, computer-readable media, and other examples of the inventive principles and concepts of the present disclosure may be implemented.

FIG. 6 illustrates an example of a PCD 600, such as a mobile phone, a smartphone, a portable game console such as an Extended Reality (XR) device, a Virtual Reality (VR) device, an Augmented Reality (AR) device, or a Mixed Reality (MR) device, etc., in which exemplary embodiments of systems, methods, computer-readable media, and other examples of the inventive principles and concepts of the present disclosure may be implemented.

The PCD 600 comprises an SoC 602, which comprises the UFS system 100 shown in FIGS. 1 and 2 or a similar system. For purposes of clarity, some interconnects, signals, etc., are not shown in FIG. 6.

The SoC 602 may include a CPU 601 that acts as, or is communication with, the UFS host controller 101 shown in FIGS. 1 and 2, an NPU 605, a GPU 606, a DSP 607, an analog signal processor 608, a modem/transceiver 654, or other processors. The CPU 601 may include one or more CPU cores, such as a first CPU core $\mathbf{601}_1$, a second CPU core $\mathbf{601}_2$, etc., through an $M^{th}$ CPU core $\mathbf{601}_M$. For exemplary purposes the UFS host controller 101 is shown as being separate from, and in communication with, the CPU 601.

A display controller 609 and a touch-screen controller 612 may be coupled to the CPU 601. A touchscreen display 614 external to the SoC 602 may be coupled to the display controller 609 and the touch-screen controller 612.

The PCD 600 may further include a video decoder 616 coupled to the CPU 601. A video amplifier 618 may be coupled to the video decoder 616 and to the touchscreen display 614. A video port 620 may be coupled to the video amplifier 618. A universal serial bus ("USB") controller 622 may also be coupled to CPU 601, and a USB port 624 may be coupled to the USB controller 622. A subscriber identity module ("SIM") card 626 may also be coupled to the CPU 101.

One or more memories 628 may be coupled to the CPU 101. The one or more memories 628 may include both volatile and non-volatile memories. Examples of volatile memories include static random access memory ("SRAM") and dynamic random access memory ("DRAM"). Such memories may be external to the SoC 602 or internal to the SoC 602. The one or more memories 628 may include local cache memory and/or a system-level cache memory. The one or more memories 628 may also include/comprise the UFS device 102 illustrated in FIGS. 1 and 2.

A stereo audio CODEC 634 may be coupled to the analog signal processor 608. An audio amplifier 636 may be coupled to the stereo audio CODEC 634. First and second stereo speakers 638 and 640, respectively, may be coupled to the audio amplifier 636. A microphone amplifier 642 may be coupled to the stereo audio CODEC 634, and a microphone 644 may be coupled to the microphone amplifier 642. A frequency modulation ("FM") radio tuner 646 may be coupled to the stereo audio CODEC 634. An FM antenna 648 may be coupled to the FM radio tuner 646. Further, stereo headphones 650 may be coupled to the stereo audio CODEC 634. Other devices that may be coupled to the CPU 101 include one or more digital (e.g., CCD or CMOS) cameras 652.

The modem or RF transceiver 654 may be coupled to the analog signal processor 608 and to the CPU 101. An RF switch 656 may be coupled to the RF transceiver 654 and to an RF antenna 658. In addition, a keypad 660 and a mono headset with a microphone 662 may be coupled to the analog signal processor 608. The SoC 602 may have one or more internal or on-chip thermal sensors 670. A power supply 674 and a power management IC (PMIC) 676 may supply power to the SoC 602.

Firmware or software may be stored in any of the above-described memories, or may be stored in a local memory directly accessible by the processor hardware on which the software or firmware executes. Execution of such firmware or software by logic of the UFS device 110 and by the CPU 101 may control aspects of any of the above-described methods or configure aspects of any of the above-described systems. Any such memory or other non-transitory storage medium having firmware or software stored therein in computer-readable form for execution by processor hardware may be an example of a "computer-readable medium," as the term is understood in the patent lexicon.

Implementation examples are described in the following numbered clauses:

1. A method for enhancing an endurance of a Universal Flash Storage (UFS) device, the method comprising:
   determining a lifetime estimate value of a pinned region of a write booster;
   determining whether the lifetime estimate value exceeds a preselected lifetime estimate threshold (TH) value; and
   in response to a determination that the lifetime estimate value exceeds the preselected lifetime estimate TH value, relocating the pinned region to a portion of a non-pinned region of the write booster.
2. The method of clause 1, further comprising: updating a logical-to-physical address mapping for the relocated pinned region.
3. The method of clauses 1-2, further comprising: prior to relocating the pinned region, determining respective lifetime estimate values for respective portions of the non-pinned region.
4. The method of clause 3, further comprising: comparing the respective lifetime estimate values for the respective portions of the non-pinned region with one another to determine which of the respective lifetime estimate values is the least lifetime estimate value.
5. The method of clause 4, further comprising: relocating the pinned region to the portion of the non-pinned region that has the least lifetime estimate value.
6. A system for enhancing an endurance of a Universal Flash Storage (UFS) device, the system comprising:
   a write booster buffer comprising a pinned region and a non-pinned region;
   first logic configured to determine a lifetime estimate value of the pinned region;
   second logic configured to determine whether the lifetime estimate value exceeds a preselected lifetime estimate threshold (TH) value; and
   third logic configured to relocate the pinned region to a portion of the non-pinned region in response to a determination that the lifetime estimate value exceeds the preselected lifetime estimate TH value.
7. The system of clause 6, further comprising: fourth logic configured to update a logical-to-physical address mapping for the relocated pinned region.
8. The system of clauses 6-7, further comprising: fifth logic configured to determine respective lifetime estimate values for respective portions of the non-pinned region prior to relocating the pinned region.
9. The system of clauses 6-8, further comprising: sixth logic configured to compare the respective lifetime estimate values for the respective portions of the non-pinned region with one another to determine which of the respective lifetime estimate values is the least lifetime estimate value.
10. The system of clauses 6-9, wherein the third logic is configured to relocate the pinned region to the portion of the non-pinned region that has the least lifetime estimate value.
11. The system of clauses 6-10, further comprising a memory device.
12. The system of clause 11, wherein the memory device comprises flash memory.
13. The system of clauses 6-12, wherein the write booster comprises single-level-cell (SLC) NAND flash memory cells and the memory device comprises triple-level-cell (TLC) NAND flash memory cells.
14. A computer program product comprising a non-transitory computer usable medium having a computer readable program code embodied therein, said computer readable program code adapted to be executed to implement a method for enhancing endurance of a Universal Flash Storage (UFS) device, said method comprising:
   determining a lifetime estimate value of a pinned region of a write booster;
   determining whether the lifetime estimate value exceeds a preselected lifetime estimate threshold (TH) value; and
   in response to a determination that the lifetime estimate value exceeds the preselected lifetime estimate TH value, relocating the pinned region to a portion of a non-pinned region of the write booster.
15. The computer program product of clause 14, wherein the program code implementing the method further comprises: updating a logical-to-physical address mapping for the relocated pinned region.
16. The computer program product of clauses 14-15, wherein the program code implementing the method further comprises: prior to relocating the pinned region, determining respective lifetime estimate values for respective portions of the non-pinned region.
17. The computer program product of clauses 14-16, wherein the program code implementing the method further comprises: comparing the respective lifetime estimate values for the respective portions of the non-pinned region with one another to determine which of the respective lifetime estimate values is the least lifetime estimate value.
18. The computer program product of clauses 14-17, wherein the program code implementing the method further comprises: relocating the pinned region to the portion of the non-pinned region that has the least lifetime estimate value.
19. The computer program product of clauses 14-18, wherein the write booster comprises flash memory cells.
20. The computer program product of clause 19, wherein the flash memory cells of the write booster comprise single-level-cell (SLC) NAND flash memory cells.

Alternative embodiments will become apparent to one of ordinary skill in the art to which the invention pertains in view of the present disclosure. Therefore, although selected aspects have been illustrated and described in detail, it will be understood that various substitutions and alterations may be made therein.

What is claimed is:

1. A method for enhancing an endurance of a Universal Flash Storage (UFS) device, the method comprising:
   determining, by a UFS device controller, a lifetime estimate value of a pinned region of a write booster buffer;
   determining, by the UFS device controller, whether the lifetime estimate value exceeds a preselected lifetime estimate threshold (TH) value; and
   in response to a determination that the lifetime estimate value exceeds the preselected lifetime estimate TH value, the UFS device controller relocating the pinned region to a portion of a non-pinned region of the write booster buffer while a host controller-to-UFS device link is hibernated, to form a new UFS pinned region, wherein relocating comprises updating a logical-to-physical (L2P) address mapping for the new UFS pinned region and sending the L2P address mapping for the new UFS pinned region to a UFS host controller.

2. The method of claim 1, further comprising: saving the L2P address mapping for the new UFS pinned region within at least one of a memory and the UFS device.

3. The method of claim 1, further comprising: prior to relocating the pinned region, determining respective lifetime estimate values for respective portions of the non-pinned region.

4. The method of claim 3, further comprising: comparing the respective lifetime estimate values for the respective portions of the non-pinned region with one another to determine which of the respective lifetime estimate values is the least lifetime estimate value.

5. The method of claim 4, further comprising: relocating the pinned region to the portion of the non-pinned region that has the least lifetime estimate value.

6. A system for enhancing an endurance of a Universal Flash Storage (UFS) device, the system comprising:

a UFS host controller in communication with a UFS device via a host controller-to-UFS device link;

the UFS device comprising:

a write booster buffer comprising a pinned region and a non-pinned region;

first logic of a UFS device controller configured to determine a lifetime estimate value of the pinned region;

second logic of the UFS device controller configured to determine whether the lifetime estimate value exceeds a preselected lifetime estimate threshold (TH) value; and third logic of the UFS device controller configured to, while the host controller-to-UFS device link is hibernated, relocate the pinned region to a portion of the non-pinned region to form a new UFS pinned region in response to a determination that the lifetime estimate value exceeds the preselected lifetime estimate TH value, and to update a logical-to-physical (L2P) address mapping for the new UFS pinned region and send the L2P address mapping for the new UFS pinned region to the UFS host controller.

7. The system of claim 6, further comprising: fourth logic configured to save the new L2P address mapping for the new UFS pinned region within at least one of a memory and the UFS device.

8. The system of claim 7, further comprising: fifth logic configured to determine respective lifetime estimate values for respective portions of the non-pinned region prior to relocating the pinned region.

9. The system of claim 8, further comprising: sixth logic configured to compare the respective lifetime estimate values for the respective portions of the non-pinned region with one another to determine which of the respective lifetime estimate values is the least lifetime estimate value.

10. The system of claim 9, wherein the third logic is configured to relocate the pinned region to the portion of the non-pinned region that has the least lifetime estimate value.

11. The system of claim 6, further comprising a memory device.

12. The system of claim 11, wherein the memory device comprises flash memory.

13. The system of claim 12, wherein the write booster comprises single-level-cell (SLC) NAND flash memory cells and the memory device comprises triple-level-cell (TLC) NAND flash memory cells.

14. A computer program product comprising a non-transitory computer usable medium having a computer readable program code embodied therein, said computer readable program code adapted to be executed to implement a method for enhancing endurance of a Universal Flash Storage (UFS) device, said method comprising:

determining, by a UFS device controller, a lifetime estimate value of a pinned region of a write booster buffer;

determining, by the UFS device controller, whether the lifetime estimate value exceeds a preselected lifetime estimate threshold (TH) value; and in response to a determination that the lifetime estimate value exceeds the preselected lifetime estimate TH value, while a host controller-to-UFS device link is hibernated, the UFS device controller relocating the pinned region to a portion of a non-pinned region of the write booster buffer to form a new UFS pinned region, updating a logical-to-physical (L2P) address mapping for the new UFS pinned region, and sending the L2P address mapping for the new UFS pinned region to a UFS host controller.

15. The computer program product of claim 14, wherein the program code implementing the method further comprises: saving the new L2P address mapping for the new UFS pinned region within at least one of a memory and the UFS device.

16. The computer program product of claim 15, wherein the program code implementing the method further comprises: prior to relocating the pinned region, determining respective lifetime estimate values for respective portions of the non-pinned region.

17. The computer program product of claim 16, wherein the program code implementing the method further comprises: comparing the respective lifetime estimate values for the respective portions of the non-pinned region with one another to determine which of the respective lifetime estimate values is the least lifetime estimate value.

18. The computer program product of claim 17, wherein the program code implementing the method further comprises: relocating the pinned region to the portion of the non-pinned region that has the least lifetime estimate value.

19. The computer program product of claim 14, wherein the write booster comprises flash memory cells.

20. The computer program product of claim 19, wherein the flash memory cells of the write booster comprise single-level-cell (SLC) NAND flash memory cells.

* * * * *